No. 885,436. PATENTED APR. 21, 1908.
C. P. CLÉMENT.
AUTOMATIC PISTOL.
APPLICATION FILED JUNE 24, 1907.

4 SHEETS—SHEET 1.

Witnesses
Inventor
Charles P. Clément

No. 885,436. PATENTED APR. 21, 1908.
C. P. CLÉMENT.
AUTOMATIC PISTOL.
APPLICATION FILED JUNE 24, 1907.
4 SHEETS—SHEET 2.
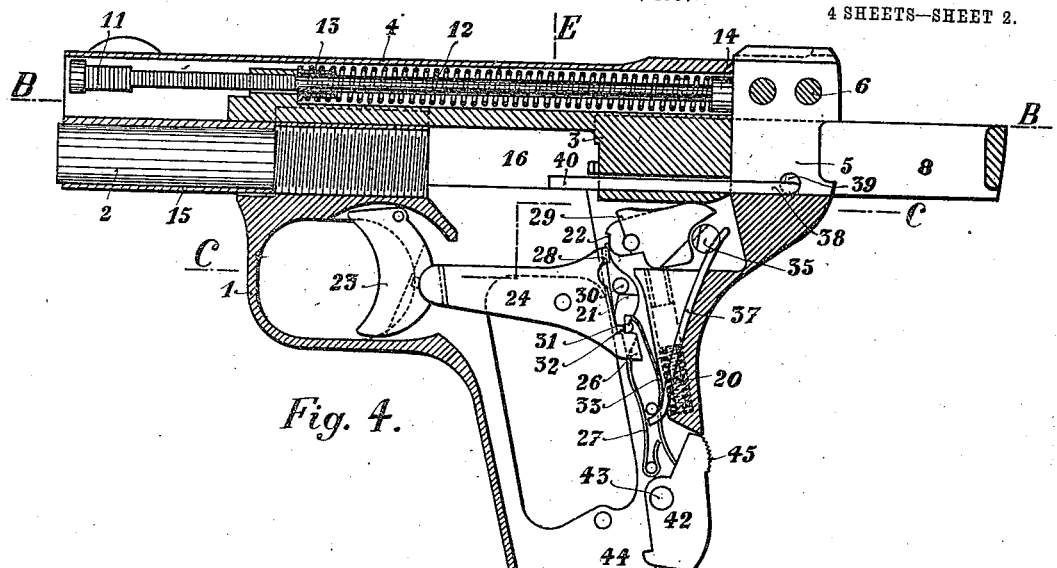
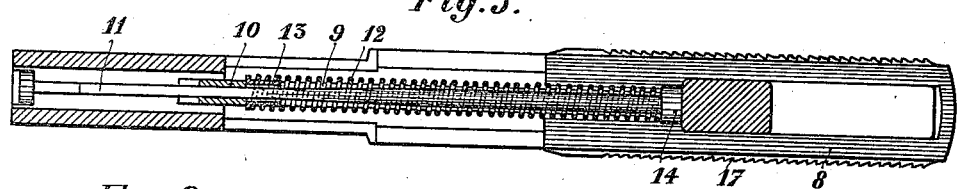
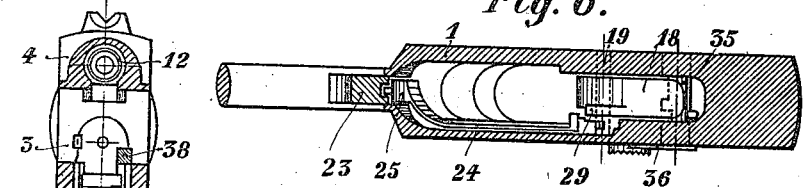
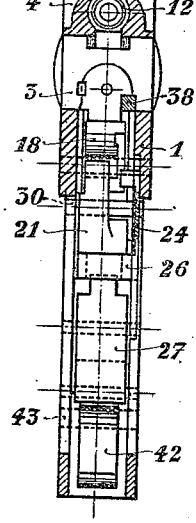
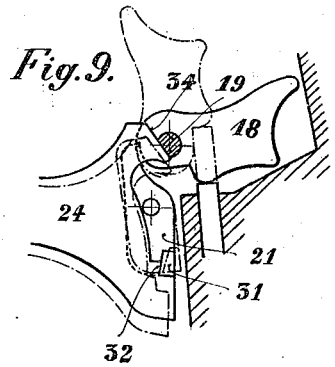

No. 885,436. PATENTED APR. 21, 1908.
C. P. CLÉMENT.
AUTOMATIC PISTOL.
APPLICATION FILED JUNE 24, 1907.
4 SHEETS—SHEET 3.
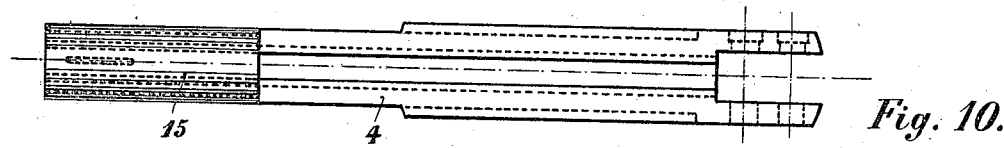
Fig. 10.
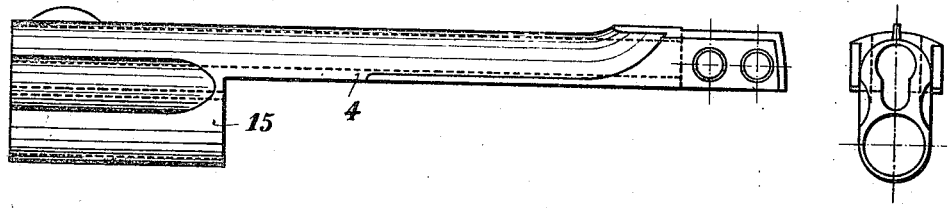
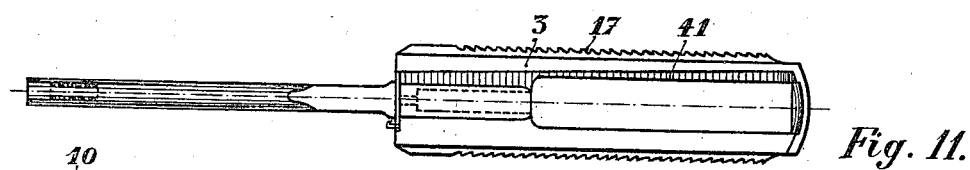
Fig. 11.
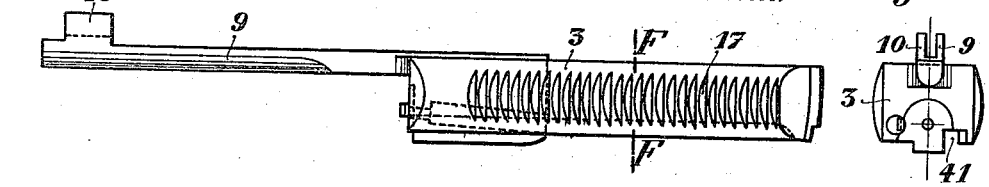
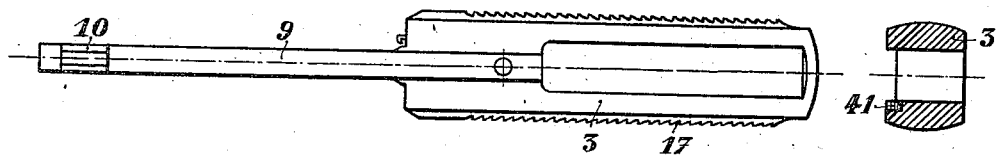
Fig. 13.                              Fig. 14.
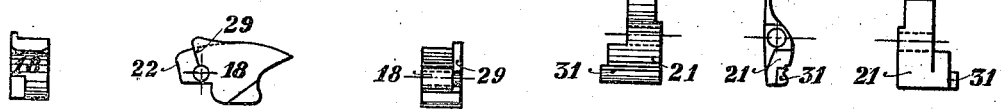
Witnesses:
C. W. Taylor
J. J. McCarthy
Inventor:
Charles P. Clément
by Foster Freeman Watson & Coit
Attorneys No. 885,436. PATENTED APR. 21, 1908.
C. P. CLÉMENT.
AUTOMATIC PISTOL.
APPLICATION FILED JUNE 24, 1907.
4 SHEETS—SHEET 4.
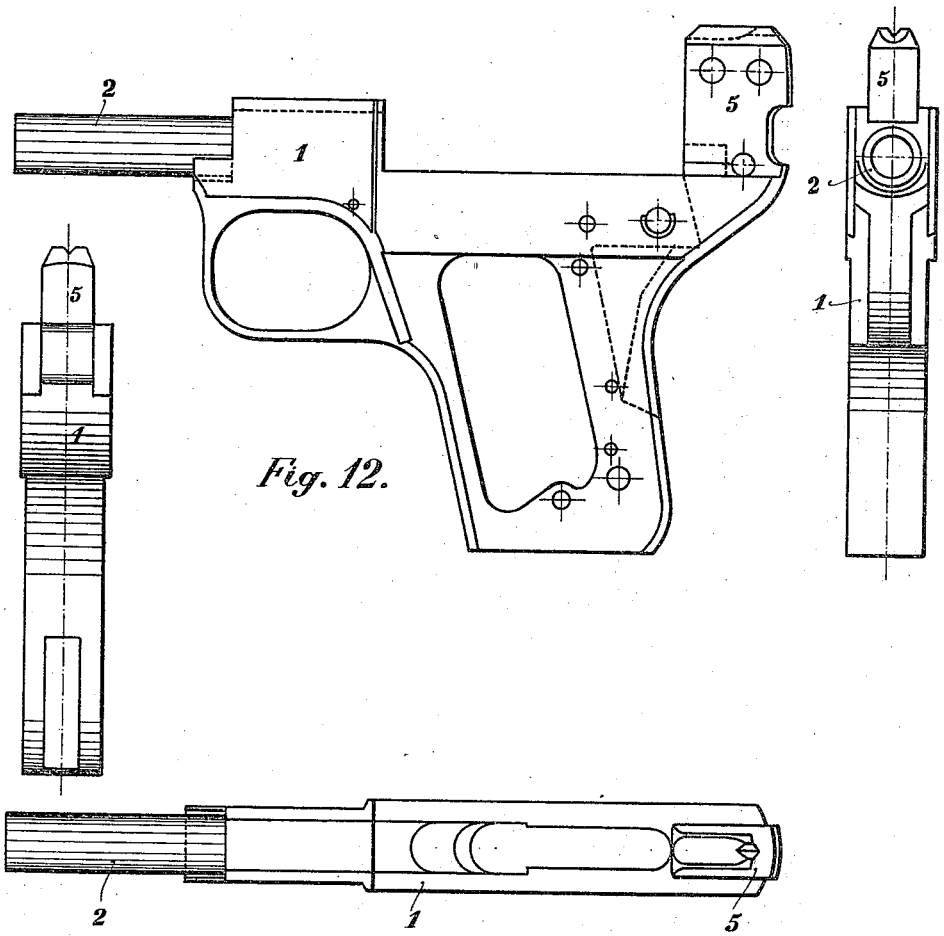
Fig. 12.
Fig. 15.
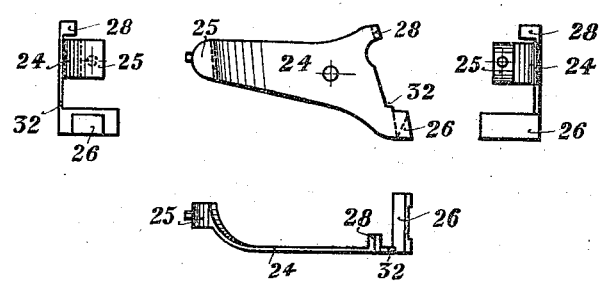
Fig. 16.

UNITED STATES PATENT OFFICE.

CHARLES PHILIBERT CLÉMENT, OF LIEGE, BELGIUM.

AUTOMATIC PISTOL.

No. 885,436.          Specification of Letters Patent.          Patented April 21, 1908.

Application filed June 24, 1907. Serial No. 380,581.

*To all whom it may concern:*

Be it known that I, CHARLES PHILIBERT CLÉMENT, subject of the King of Belgium, residing at Liege, Belgium, have invented certain new and useful Improvements in Automatic Pistols; and I hereby declare the following to be a full, clear, and exact description of the invention, such as will enable others skilled in the art to which it appertains to make and use the same.

The present invention relates to improvements in automatic recoil pistols, and particularly in pistols in which a fixed barrel and a recoiling breech-bolt are employed.

The object is to provide a strong, simple, and easily manipulated arm.

The annexed drawing represents an arm of this type.

Figure 1:
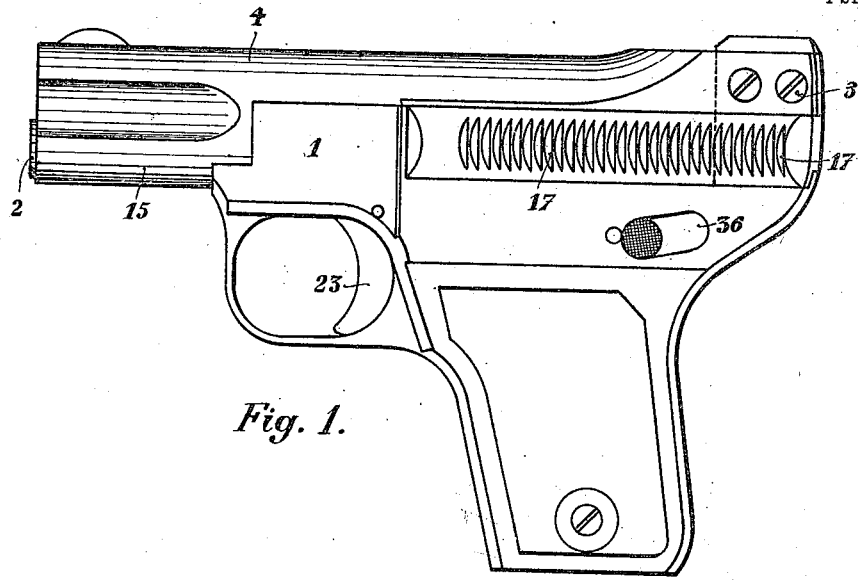
Figures 2, 7:
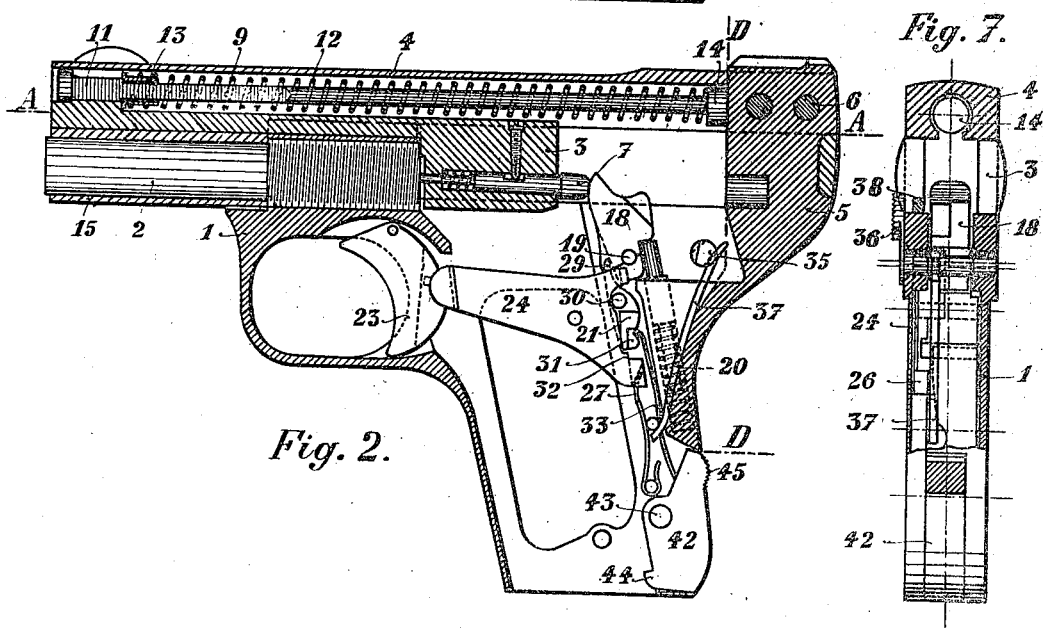
Figure 3:
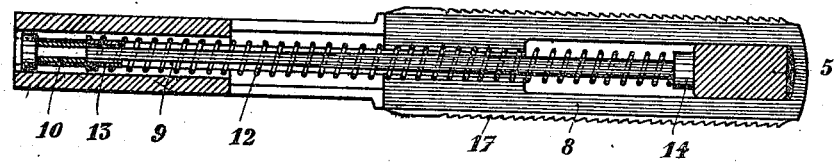

Figure 1 is an exterior view of the pistol closed. Fig. 2 is a longitudinal section of the pistol closed. Fig. 3 is a horizontal section on A—A (Fig. 2). Fig. 4 is a vertical section of the arm open. Fig. 5 is a horizontal section on B—B (Fig. 4); Fig. 6 a horizontal section on C—C (Fig. 4). Fig. 7 is a vertical section on D—D (Fig. 2). Fig. 8 is a vertical section on E—E (Fig. 4). Fig. 9 represents a modification of the trigger mechanism. Fig. 10 shows, in plan, elevation, and end view, the hood or casing which incloses the breech bolt and reaction spring. Fig. 11 shows, in top-side and underside plan, in elevation, end view and section on F—F, that part constituting the sliding bolt, the firing pin and extractor. Fig. 12 shows corresponding views of the body removed, with its barrel. Fig. 13 represents the hammer removed. Fig. 14 similarly represents the sear. Fig. 15 shows separately the link connecting the sear to the trigger mechanism. Fig. 16 represents the ejector separately.

The pistol consists of three parts; the body 1, which carries the barrel 2 and forms a grip or handle, and the trigger mechanism, the bolt, guided on the body 1, and the casing or hood 4 whose front parts surrounds the barrel 2, and which is fixed at the rear, to a rigid block 5 integral with the body 1 (Fig. 12), by means of screws 6. The bolt has a part 3, which constitutes the breech block proper, which is located against the chamber end of the barrel 2, and which carries the firing pin 7; and from this part 3 is extended towards the rear two guide bars 8 which are connected at the rear ends and laterally embrace the block 5 of the body 1, fitting side recesses therein in such a manner that the bolt can slide longitudinally on the body.

At the front, the bolt 3, is formed with an extension 9, provided near its outer end with a fork 10, in which the flattened rod 11 of the reaction spring 12, is engaged. This spring 12, is arranged around the rod 11, between the two sleeves 13 and 14 of which the sleeve 14 is carried by the block 5, while the other 13, which can slide the length of the rod 11, rests on the fork 10 of the extension 9 of bolt 3. The result of this arrangement is that the spring 12, by its expansion, tends to take the bolt towards the front, into the position of Figs. 1, 2 and 3. When the bolt 3 is driven rearwardly, by the effect of the recoil, the fork 10, together with the sleeve 13, slide the length of the rod 11, compressing the spring 12, until the solid part of bolt 3 strikes against the fixed abutment 5, on the body 1.

The whole of the parts above described are surmounted by the casing or hood 4, which is provided at the front, with a sleeve 15 surrounding the barrel 2 and which terminates at the rear, in a forked part, the two branches of which embrace the block 5, to which they are fixed by screws 6.

The casing 15 serves to guide the bolt 3 on the body 1, and to maintain the spring 12 in place above this bolt 3. The result of this arrangement is that the effect of the recoil is only exerted against the solid parts, which can be made as strong as necessary. The dismounting and mounting of the arm is very simple and can be completely effected by hand.

In the position of the breech bolt in Figs. 1, 2 and 3, the arm does not have any lateral opening; the ejection of the empty cartridges is effected through the side openings 16 which are only uncovered when the bolt 3 is taken to the rear after the firing of the cartridge.

The guide bars 8 of bolt 3 are serrated or roughened on their outer faces at 17 (see Fig. 1) to facilitate the gripping of the same between thumb and finger when it is desired to cock the firing mechanism by hand, when the first cartridge is to be introduced into the barrel. The trigger and firing mechanisms are arranged in such a manner that the disengagement which should necessarily take place between the sear and the trigger when this latter is pulled, is obtained in a simple and certain manner, so as to prevent the consecutive and involuntary firing of the cartridges contained in the magazine.

The hammer 18 is pivoted in the body 1 on the pin 19. It is pressed forwards by a hammer-spring 20, located in the rearward part of this body 1, so as to strike the firing pin 7, carried by the bolt 3, when the nose of the sear 21 is disengaged from the lip 22 when finger pressure is exerted on the trigger 23. The trigger 23 is connected to the sear 21 through the medium of the link 24, located laterally in one of the sides of the body 1. This link 24 is curved at the front to form a pivot 25, which engages in a corresponding semi-circular recess formed in the back of the trigger 23. Towards the back, the link 24 is provided with two extensions, the lower one of which carries an arm 26 which is influenced by a spring 27 in such a manner as to force the rear part of the link 24, simultaneously forwards and upwards. The upper extension of the link 24 carries upon its side, a lug or nose 28 which comes in front of the pin 19 of hammer 18, and immediately under a shoulder 29 (Figs. 2, 4, 13 and 15) with which this latter is provided.

The sear 21 is pivoted upon the pin 30, carried by the body 1, and is provided upon one side, and near its lower end, with a heel 31, which can engage with a recess 32 formed at the rear of the lower extension of the link 24. A spring 33 acts on the sear 21, and tends to press the nose of the latter against the hammer 18, to maintain it in engagement with the lip 22. Thus, after the bolt 3, (when driven rearwardly by a recoil or drawn back by hand) has cocked the hammer 18 (Fig. 4), the shoulder 29 of this latter is separated from the nose 28 of the link 24, and the spring 27, by pressing on the arm 26, has raised the rear part of this link 24 so as to bring the notch 32 into engagement with the heel 31 of the sear 21.

When the breech block resumes its forward position and other parts are in these positions last named the pistol is ready for firing. If the trigger 23 is pulled, the link 24, is pushed rearwardly, tilts the sear 21, on its axis 30 and causes the same to disengage the hammer 18, which, by the action of its spring 20, is then impelled against the firing pin 7. The shoulder 29 of hammer 18 then meets nose 28 of the link 24 so that the rear part of the latter is depressed (Fig. 1). The notch 32 of the link 24 also leaves the heel 31 of the sear 21, so that no connection exists between the sear 21 and the trigger 23, when the hammer 18 is released. When the bolt 3 in moving rearwardly, has again cocked the hammer 18, the spring 27, pressing on the arm 26 of the disengaged link 24, will force this part up and forward and will bring, as before, its notch 32, into engagement with the heel 31 of the sear 21 (Fig. 4).

Fig. 9 represents a modification of the mechanism showing the release and engagement of notch 32, of link 24, with the heel 31, of the sear 21. In this arrangement, the upper branch of the link 24, is provided, towards the rear, with an inclined face 34, which, when the trigger is pulled, engages the pin 19 of the hammer 18 (in the position represented in dotted lines). This face 34 then slides on the pin 19 and causes the rear part of the link 24 to be depressed so that at the moment when the trigger arrives at the end of its movement, that is to say, after the release of the hammer, the notch 32 of the link 24, has left the heel 31 of the sear 21 (in the position represented in dotted lines). As in the preceding arrangement, the link 24, is always pressed forwardly and upwardly by a spring 27. This spring 27, in the two examples described, acts also upon the trigger 23, through the link 24, and pivot 25, so that the trigger spring usually employed may be dispensed with. In the arrangement represented, the safety device is constituted by a member which is adapted to render the hammer 18 inoperative; and comprises a flattened or grooved pin 35, crossing the body 1, and carrying outside the frame (Fig. 1) a lever or pusher 36, which permits of the said pin being rotated to the two positions which correspond to the effective and non-effective positions of the said safety-device. When the lever 36 occupies the position indicated in Figs. 1, 2 and 4, the recess in the pin 35 leaves the hammer 18 free to pass in front of it; if on the contrary, the solid part of the pin 35 is carried in position to be engaged by the hammer 18, this latter will be locked in its cocked position. A flat spring 37 maintains the safety 35—36 in its two positions.

The ejector consists of a rod 38 (Fig. 4 and 16) provided at the rear with a stud 39 which engages in a corresponding opening in the block 5. This rod which is thickened at its front part at 40, simply rests on the upper face of the recess in the body 1, so that it constitutes a readily removable member.

The bolt 3, is provided, on its lower face, with a longitudinal groove 41 (Fig. 11), in which the ejector 38 is received when the parts of the arm are assembled.

The rod 38 is of such a length that its front end 40 extends slightly beyond the front face of the bolt 3, when this latter is at the end of its rearward travel (Fig. 4) this projecting part thus constitutes an abutment against which one side of the cartridge rim is made to impinge on being withdrawn from the chamber of the barrel and which has the effect of causing the ejection of this shell in the usual manner, through the side openings 16, which are uncovered when the bolt travels rearwardly. This arrangement of the ejector considerably simplifies the mechanism of the body; it is moreover, certain in action, and not liable to become deranged or damaged. The magazine fastening consists of a small lever 42 located in a slot formed in the rear wall of the handle, and pivoted upon a pin 43. The lower part of this lever 42, which is provided at the front with the nose 44, comes flush with the rear face of the handle while the upper end has at the back, a roughened projection 45, forming a pusher projecting slightly from this face.

The lower part of sear spring 33, is also arranged to act on this lever 42 and tends to engage its nose 44 with the usual corresponding notch of the magazine.

By pressing on the pusher 45, the nose 44, is disengaged and the magazine can be withdrawn. The pressure which the palm of the hand exerts on this lever 42,—especially on the lower part—when the pistol is held for firing, maintains the nose 44, in engagement with the notch of the magazine, and thus positively secures said magazine against inadvertent detachment when the pistol is in use.

It is obvious that the arrangement of the lever 42, can be reversed.

Having fully described my said invention, what I desire to claim and secure by Letters Patent is:—

1. In a fire arm a frame supporting a barrel and provided with an abutment integral with the frame at the rear of the barrel, an intervening sliding breech block, and guide bars fitting side recesses in the frame connected integrally with the breech block and together at the rear back of the abutment and with serrated outer faces.

2. The combination in a fire arm of a frame having an abutment integral therewith, and supporting a barrel forward of and in line with said abutment, a breech block sliding between the abutment and the barrel and having a forwardly extending bar, a spring bearing on the frame at the rear and arranged above said bar, and a projection on the bar for engaging the front end of the spring.

3. The combination in a fire arm of a frame having an abutment integral therewith, and supporting a barrel forward of and in line with said abutment, a breech block sliding between the abutment and the barrel and having a forwardly extending bar, a spring bearing on the frame at the rear and arranged above said bar, and a projection on the bar for engaging the front end of the spring, and a casing inclosing the spring and supported at the rear by said abutment.

4. The combination in a fire arm of a frame, a barrel supported thereby, an abutment on the frame beyond the rear of the barrel, a breech block sliding between the barrel and the abutment, a bar extending over the barrel forward from the breech block and provided with a forked projection, a rod supported at the rear by the abutment, extending over the bar and carrying a coiled spring, and a sleeve sliding on the rod in a position to be engaged by the projection.

5. The combination in a fire arm of a frame supporting a barrel and with an abutment at the rear of the barrel, an intervening recess and breech block sliding therein, an ejector rod connected with the abutment and lying on the face of the recess, the breech block having a groove receiving said rod.

6. The combination with the hammer, trigger and sear of a fire arm, of a link pivoted to the trigger at the forward end and provided with separated shoulders at the rear to engage the sear and hammer respectively at different times, as and for the purpose set forth.

7. The combination with the trigger, hammer, and sear of a fire arm, of a link having a pivotal connection with the trigger at the forward end, and having two shoulders one to engage the hammer when the latter descends and the other for engaging the sear when the rear end of the link is elevated, and a spring bearing on the link to press it forward and upward, and thus also to carry the trigger forward.

In testimony whereof I have signed my name to this specification in the presence of two subscribing witnesses.

CHARLES PHILIBERT CLÉMENT.

Witnesses:
 JULES FORIR,
 L. BOËL.